(12) United States Patent
Zhong et al.

(10) Patent No.: US 10,274,187 B2
(45) Date of Patent: Apr. 30, 2019

(54) CABINENT APPARATUS AND CABINET LIGHT ASSEMBLY

(71) Applicant: XIAMEN LEEDARSON LIGHTING GROUP CO., LTD., Xiamen (CN)

(72) Inventors: Niyang Zhong, Xiamen (CN); Weizhong Li, Xiamen (CN); Shengfang Zheng, Xiamen (CN)

(73) Assignee: XIAMEN LEEDARSON LIGHTING GROUP CO., LTD., Xiamen (CN)

( * ) Notice: Subject to any disclaimer, the term of this patent is extended or adjusted under 35 U.S.C. 154(b) by 130 days.

(21) Appl. No.: 15/227,938

(22) Filed: Aug. 3, 2016

(65) Prior Publication Data
US 2017/0175995 A1 Jun. 22, 2017

(30) Foreign Application Priority Data

Dec. 18, 2015 (CN) .......................... 2015 1 0960873

(51) Int. Cl.
| | |
|---|---|
| *F21S 4/28* | (2016.01) |
| *F21S 9/02* | (2006.01) |
| *F21V 8/00* | (2006.01) |
| *F21V 33/00* | (2006.01) |
| *F21Y 105/00* | (2016.01) |
| *F21Y 105/10* | (2016.01) |
| *F21Y 115/10* | (2016.01) |
| *F21W 131/301* | (2006.01) |

(52) U.S. Cl.
CPC ............ *F21V 33/0012* (2013.01); *F21S 9/02* (2013.01); *G02B 6/0068* (2013.01); *G02B 6/0095* (2013.01); *F21S 4/28* (2016.01); *F21W 2131/301* (2013.01); *F21Y 2105/00* (2013.01); *F21Y 2105/10* (2016.08); *F21Y 2115/10* (2016.08); *G02B 6/0038* (2013.01); *G02B 6/0061* (2013.01); *G02B 6/0065* (2013.01); *G02B 6/0078* (2013.01)

(58) Field of Classification Search
None
See application file for complete search history.

(56) References Cited

U.S. PATENT DOCUMENTS

2005/0237732 A1* 10/2005 Lagman ................. A47B 57/40
362/132
2013/0021791 A1* 1/2013 Hsu .......................... F21S 4/20
362/217.13

* cited by examiner

*Primary Examiner* — Britt D Hanley
(74) *Attorney, Agent, or Firm* — Chun-Ming Shih

(57) ABSTRACT

A cabinet light includes a light emitting element, a light housing, conductive terminals, a cabinet body, and conductive rails. The light emitting element and the conductive terminals are fixed on the light housing. The conductive rails are fixed on the cabinet body. One end of the conductive terminal is electrically connected to the light emitting element. At least one positioning element is disposed on the cabinet body corresponding to the light housing. When the light housing is fixed on the cabinet body through the positioning element, the other end of the conductive terminal is elastically and electrically connected to the conductive rail. The cabinet body has advantages of simple wiring and use flexibility.

17 Claims, 17 Drawing Sheets

CABINENT APPARATUS AND CABINET LIGHT ASSEMBLY

FIELD OF INVENTION

The present invention relates to a cabinet apparatus and a cabinet light assembly and more particularly relates to an adjustable cabinet apparatus and an adjustable cabinet light assembly.

BACKGROUND

Cabinets are square, rectangular or other geometry shape storage devices for storing daily use items like closing and document files, and are widely found everywhere. Cabinets may be classified into wardrobes, cupboards, drawers, etc. Most cabinets, however, do not have illumination devices. Without illumination, users rely on lights emitted from outside of windows or electric lights in the room to recognize and to take items from cabinets. Also, because of illuminating angles, the inside space of cabinets appears darker, making people inconvenient to retrieve or place items in cabinets. For cupboards with more fragile items such as dishes stored inside, it is easy for users to break fragile items therein. Thus, there is a need to provide better illumination inside cabinets.

SUMMARY OF INVENTION

According to an embodiment of the present invention, a cabinet apparatus includes a cabinet body, a conductive rail, an illumination device and a conductive terminal. The conductive rail is disposed inside the cabinet body. The conductive rail is connected to a power supply. The conductive terminal is connected to the illumination device and the conductive rail. The conductive terminal is adjustable to elastically engage the conductive rail for conducting electricity from the power supply to the illumination device.

In an example, the cabinet may be a wardrobe, a cupboard, a drawer or other containers. The illumination device may be an LED (Light Emitting Diode) based illumination device that may contain one or more than one LED dies connected in series or in other manner. The conductive rail may be a metal strip mounted in the cabinet body via sticking, screws or other manner. Please be noted that the conductive rail may be made of other conductive material.

The conductive terminal is connecting the illumination device to the conductive rail so that a power supply connecting to the conductive rail supplies electrical power to the illumination device to illuminate the inner space of the cabinet.

In an example, the illumination device may be implemented with an LED strip and a light guide plate. The light guide plate may be made of plastic plate or other material and/or structures that guide light emitted from the LED strip to inner space of the cabinet body. With light guide plate, the light source is more smooth and reaching more widely in the inner space of the cabinet body.

In an example, the LED strip is placed in the inner portion of the cabinet body. The light guide plate has more light refraction points near the LED strip. As mentioned above, the light guide plate helps direct light emitted from the LED strip to different places in the cabinet body. One of light guiding design is to use refraction. Multiple light transmission path may be implemented on the light guide plate and there are multiple light exiting points on the light guide plate. In one example, there are more light exiting points close to the inner side of the cabinet body than the outer side of the cabinet body. Because it is usually darker in the inner side the cabinet, such design provides better illumination for the inner side of the cabinet body.

In another example, the conductive rail has a plurality of predetermined positions to be chosen by a user for engaging the conductive terminal to one of the predetermined positions to adjust an illumination effect of the illumination device in the cabinet body.

In addition, the cabinet apparatus may further include a positioning element for stabilizing the conductive terminal to one of the predetermined positions. For example, the positioning element may be a sliding rail structure so that the illumination device may be moved along the conductive rail with the sliding rail structure. The predetermined positions may be continuous or discrete. In discrete positions, the illumination device may be moved and stay at one position among several candidate positions. Trapping holes or other structures may be arranged to stabilize the illumination device at the selected position.

In addition, the conductive terminal may include an elastic electrode abutting on the conductive rail with an elastic force of the elastic electrode. In other words, the illumination device may be moved along the conductive trail. When the illumination device finally stops at a position, the elastic electrode abuts on the conductive rail by the elastic force of the elastic electrode.

In one example, the conductive terminal may further include a fixing cover. One end of the elastic electrode engages with the illumination device and the other end of the elastic electrode outstretches through the fixing cover to abut the conductive rail.

In one example, the elastic electrode may include a spring and a conductive cap. The conductive cap may have a slot for receiving an end of the spring. The fixing cover may have a reception hole. The conductive cap extends through the reception hole to abut the conductive rail.

There are several ways to design the conductive path for the illumination device. In one example, the conductive rail may have two paths connecting to different poles of the power supply, i.e. the positive end and the negative end. In another example, there may be two conductive rails respectively connecting to different poles of the power supply. For the later case, there are two conductive rails and two conductive terminals arranged in opposite sides of the illumination device.

The conductive rail may be disposed along a vertical direction relative to the cabinet body. In other words, the conductive rail may be arranged in a vertical direction from the ground to the top. In such case, the illumination device may be placed at different height to provide different illumination effect in the cabinet body.

Alternatively, the conductive rail may be arranged in horizontal direction. In other words, the illumination device may be moved to different horizontal positions. In addition to be designed as a straight line, the conductive rail may be arranged in curve line or any other path direction or style. Besides, more than one conductive rails may be placed in a cabinet. When there are more than one conductive rails disposed in a cabinet, these conductive rails may be connected or separated.

The conductive rail may be connected to a house power source, like a 110V or 220V power source. Related conversion is necessary to drive the illumination device if the illumination device is an LED oriented device. Such conversion circuit may be located outside the cabinet body.

Alternatively, an electrical wire may be connected to the conductive rail for users to plug the electrical wire to the house power source.

Alternatively, because LED devices are energy saving devices and consume less power than normal light devise. A rechargeable battery may be disposed in the cabinet body for providing power to drive the illumination device. In such case, the cabinet apparatus may further have a socket for charging the rechargeable battery.

A smart switch with associated detectors or a manual switch may be applied to save power or to selectively turn on or turn off the illumination device.

In addition, the illumination device and the conductive terminal may form a module that is detachable from the conductive rail. In other words, the illumination device and the conductive terminal together may be detachable from the cabinet body. Alternatively, the conductive terminal and the conductive rail may form a module and the illumination device may be detachable from the conductive terminal and the conductive rail.

In another embodiment of the present invention, a cabinet light assembly is provided to be assembled to a cabinet body. The cabinet light assembly may include a conductive rail to be installed inside the cabinet body. The conductive rail is further connected to a power supply. The cabinet light assembly may include an illumination device and a conductive terminal to be connected to the illumination device and the conductive rail. The conductive terminal is adjustable to elastically engage the conductive rail for conducting electricity from the power supply to the illumination device.

In other words, the cabinet light assembly may be provided by another manufacturer from the manufacturer that produces the cabinet body. Users may selectively buy the cabinet light assembly to be installed in the cabinet body. Similar to aforementioned embodiments, the cabinet light assembly may have various designs and alternative variation options.

DETAILED DESCRIPTION

Figure 8:
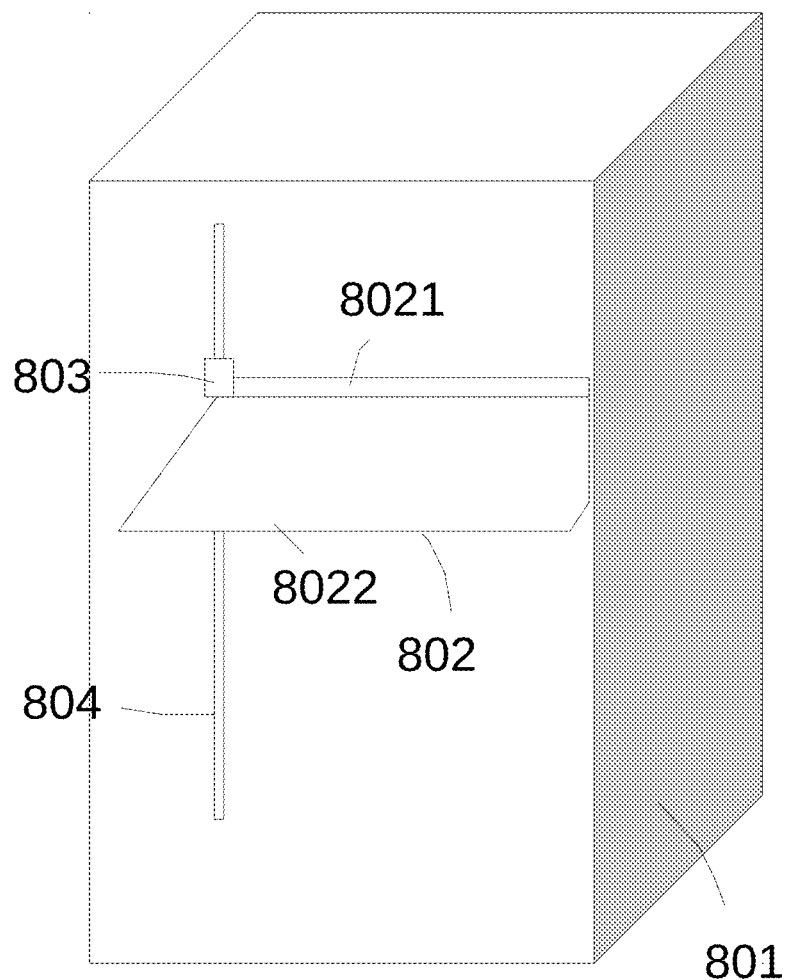
FIG. 8 is a diagram illustrating a cabinet apparatus embodiment.

Please refer to FIG. 8. According to an embodiment of the present invention, a cabinet apparatus includes a cabinet body 801, a conductive rail 804, an illumination device 802 and a conductive terminal 803. The conductive rail 804 is disposed inside the cabinet body 801. The conductive rail 804 is connected to a power supply (not shown). The conductive terminal 803 is connected to the illumination device 802 and the conductive rail 804. The conductive terminal 803 is adjustable to elastically engage the conductive rail 804 for conducting electricity from the power supply to the illumination device 802.

In an example, the cabinet may be a wardrobe, a cupboard, a drawer or other containers. The illumination device 802 may be an LED (Light Emitting Diode) based illumination device that may contain one or more than one LED dies connected in series or in other manner. The conductive rail 804 may be a metal strip mounted in the cabinet body 801 via sticking, screws or other manner. Please be noted that the conductive rail 804 may be made of other conductive material.

The conductive terminal 803 is connecting the illumination device 802 to the conductive rail 804 so that a power supply connecting to the conductive rail 804 supplies electrical power to the illumination device 802 to illuminate the inner space of the cabinet body 801.

In an example, the illumination device 802 may be implemented with a LED strip 8021 and a light guide plate 8022. The light guide plate 8022 may be made of plastic plate or other material and/or structures that guide light emitted from the LED strip 8021 to inner space of the cabinet body 801. With light guide plate 8022, the light source is more smooth and reaching more widely in the inner space of the cabinet body 801.

The light guide plate 8022 may be implemented by applying proper laser beam on a transparent plastic plate to form light guiding tunnels. Other methods for producing a light guide plate may be selected based on design requirement and cost concern.

In an example, the LED strip 8021 is placed in the inner portion of the cabinet body 801. The light guide plate 8022 has more light refraction points near the LED strip 8021. As mentioned above, the light guide plate 8022 helps direct light emitted from the LED strip 8021 to different places in the cabinet body 801. One design of light guiding is to use refraction. Multiple light transmission paths may be implemented on the light guide plate 8022 and there are multiple light exiting points on the light guide plate 8022. In one example, there are more light exiting points close to the inner side of the cabinet body 801 than the outer side of the cabinet body 801. Because it is usually darker in the inner side the cabinet, such design will refract more light close to the inner side of the cabinet body 801 and provides better illumination for t the cabinet body 801.

Figure 9:
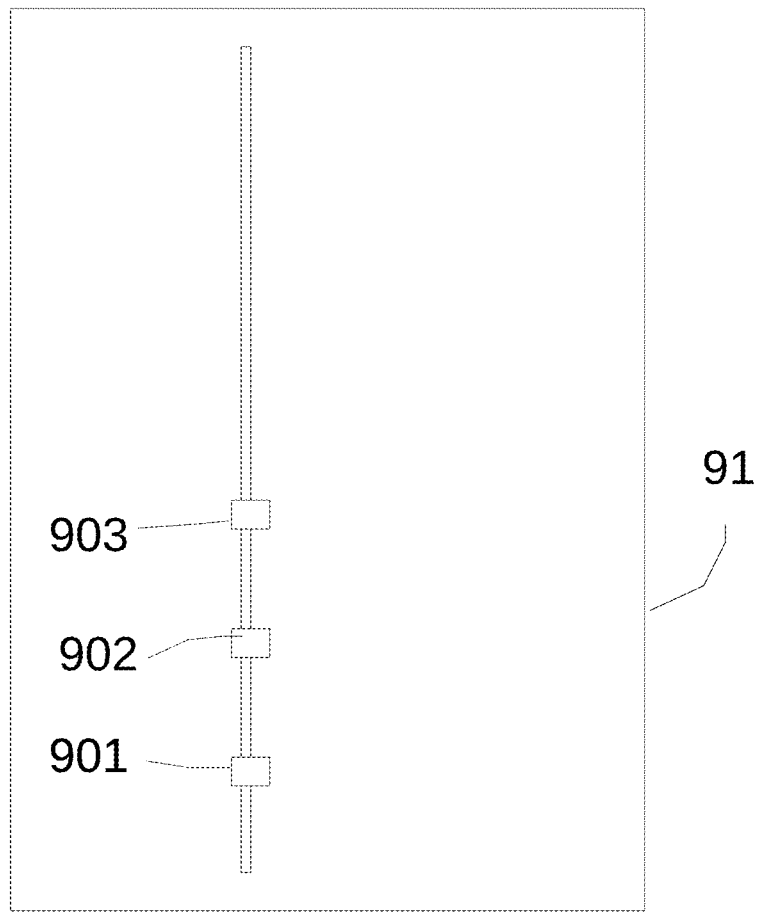
FIG. 9 illustrates different positions on a conductive rail.

Please refer to FIG. 9. In another example, the conductive rail 90 has a plurality of predetermined positions 901, 902, 903 relative to a wall 91 of a cabinet to be chosen by a user for engaging the conductive terminal to one of the predetermined positions to adjust an illumination effect of the illumination device in the cabinet body.

Figure 10:
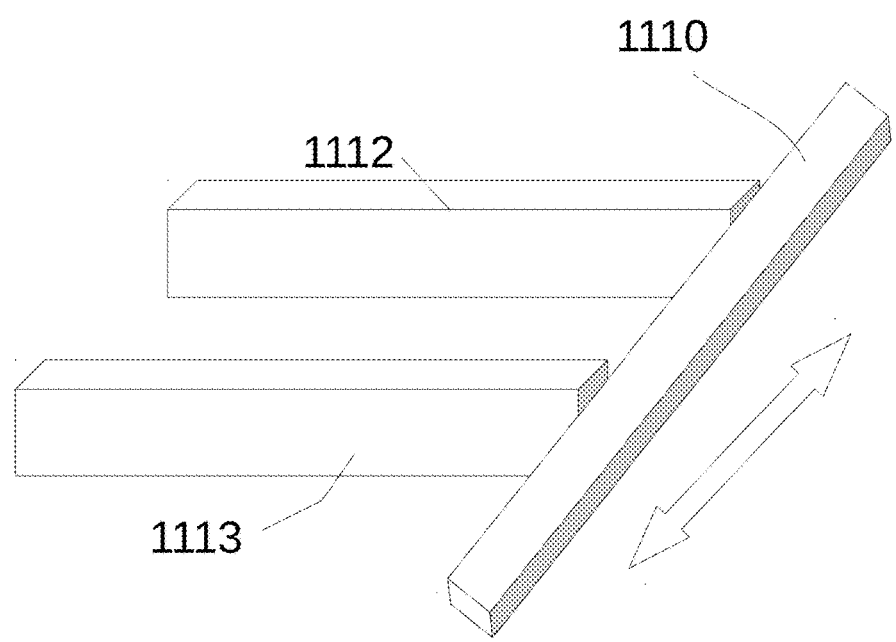
FIG. 10 illustrates an illumination device moving along a sliding rail.

Please refer to FIG. 10. In addition, the cabinet apparatus may further include a positioning element for stabilizing the conductive terminal to one of the predetermined positions. For example, the positioning element may be a sliding rail structure 1110, so that the illumination device may be moved along the conductive rail with the sliding rail structure, e.g. from a first position 1112 to a second position 1113. The predetermined positions may be continuous or discrete. In discrete positions, the illumination device may be moved and stay at one position among several candidate positions. Trapping holes or other structures may be arranged to stabilize the illumination device at the selected position.

In addition, the conductive terminal may include an elastic electrode abutting on the conductive rail with an elastic force of the elastic electrode. In other words, the illumination device may be moved along the conductive trail. When the illumination device finally stops at a position, the elastic electrode abuts on the conductive rail by the elastic force of the elastic electrode.

In one example, the conductive terminal may further include a fixing cover. One end of the elastic electrode engages with the illumination device and the other end of the elastic electrode outstretches through the fixing cover to abut the conductive rail.

In one example, the elastic electrode may include a spring and a conductive cap. The conductive cap may have a slot for receiving an end of the spring. The fixing cover may have a reception hole. The conductive cap extends through the reception hole to abut the conductive rail.

There are several ways to design the conductive path for the illumination device. In one example, the conductive rail may have two paths connecting to different poles of the power supply, i.e. the positive end and the negative end. In another example, there may be two conductive rails respectively connecting to different poles of the power supply. For the later case, there are two conductive rails and two conductive terminals arranged in opposite sides of the illumination device.

The conductive rail may be disposed along a vertical direction relative to the cabinet body. In other words, the conductive rail may be arranged in a vertical direction from the ground to the top. In such case, the illumination device may be placed at different height to provide different illumination effect in the cabinet body.

Alternatively, the conductive rail may be arranged in horizontal direction. In other words, the illumination device may be moved to different horizontal positions. In addition to be designed as a straight line, the conductive rail may be arranged in curve line or any other path direction or style. Besides, more than one conductive rails may be placed in a cabinet. When there are more than one conductive rails disposed in a cabinet, these conductive rails may be connected or separated.

The conductive rail may be connected to a house power source, like a 110V or 220V power source. Related conversion is necessary to drive the illumination device if the illumination device is an LED oriented device. Such conversion circuit may be located inside the cabinet body. Alternatively, an electrical wire may be connected to the conductive rail for users to plug the electrical wire to the house power source.

Alternatively, because LED devices are energy saving devices and consume less power than normal light devise. A rechargeable battery may be disposed in the cabinet body for providing power to drive the illumination device. In such case, the cabinet apparatus may further have a socket for charging the rechargeable battery.

A smart switch with associated detectors or a manual switch may be applied to save power or to selectively turn on or turn off the illumination device.

In addition, the illumination device and the conductive terminal may form a module that is detachable from the conductive rail. In other words, the illumination device and the conductive terminal together may be detachable from the cabinet body. Alternatively, the conductive terminal and the conductive rail may form a module and the illumination device may be detachable from the conductive terminal and the conductive rail.

In another embodiment of the present invention, a cabinet light assembly is provided to be assembled to a cabinet body. The cabinet light assembly may include a conductive rail to be installed inside the cabinet body. The conductive rail is further connected to a power supply. The cabinet light assembly may include an illumination device and a conductive terminal to be connected to the illumination device and the conductive rail. The conductive terminal is adjustable to elastically engage the conductive rail for conducting electricity from the power supply to the illumination device.

In other words, the cabinet light assembly may be provided by another manufacturer from the manufacturer that produces the cabinet body. Users may selectively buy the cabinet light assembly to be installed in the cabinet body. Similar to aforementioned embodiments, the cabinet light assembly may have various designs and alternative variation options.

A more detailed embodiment is provided as follows with associated drawings.

Figure 11:
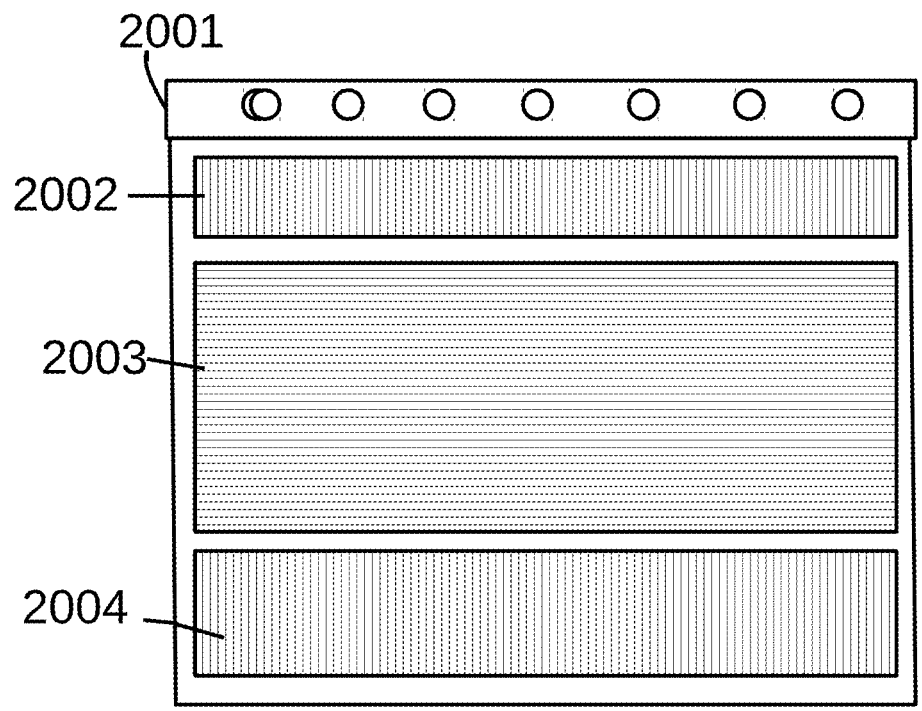
FIG. 11 illustrates an example of light guide plate design.

Please refer to FIG. 11, which illustrates a light guide plate 2001 example. In FIG. 11, the whole area of the light guide plate 2001 is divided into three sub-areas 2002, 2003 and 2004. Different amount of refraction points may be arranged in different sub-areas 2002, 2003 and 2004. For example, the sub-areas 2002 and the 2004 may have less refraction points so that less light is emitted from these two sub-areas 2002, 2004 compared with the sub-area 2003. Such design makes inner space having more light compared with the most inner part under which usually no object is needed to be shown and compared with the most outer part under which there is usually environment light outside a cabinet.

Figure 12:
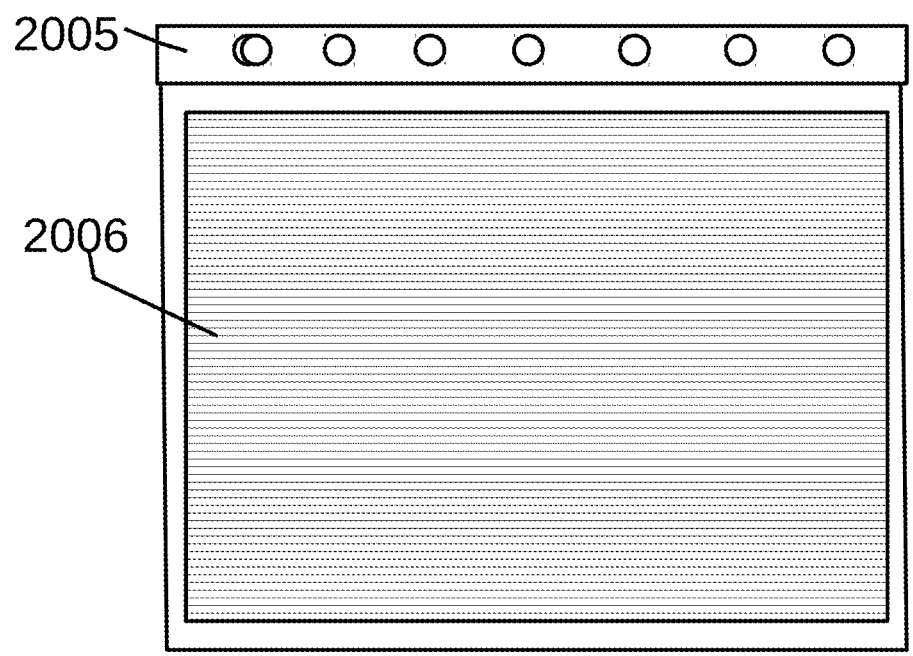
FIG. 12 illustrates another example of light guide plate design.

Please refer to FIG. 12, which illustrates another design of a light guide plate 2005. In FIG. 12, the light guide plate 2005 is not divided discretely into a number of sub-areas but a single area 2006. Nevertheless, the refraction points may be varied in different place.

Figure 13A:
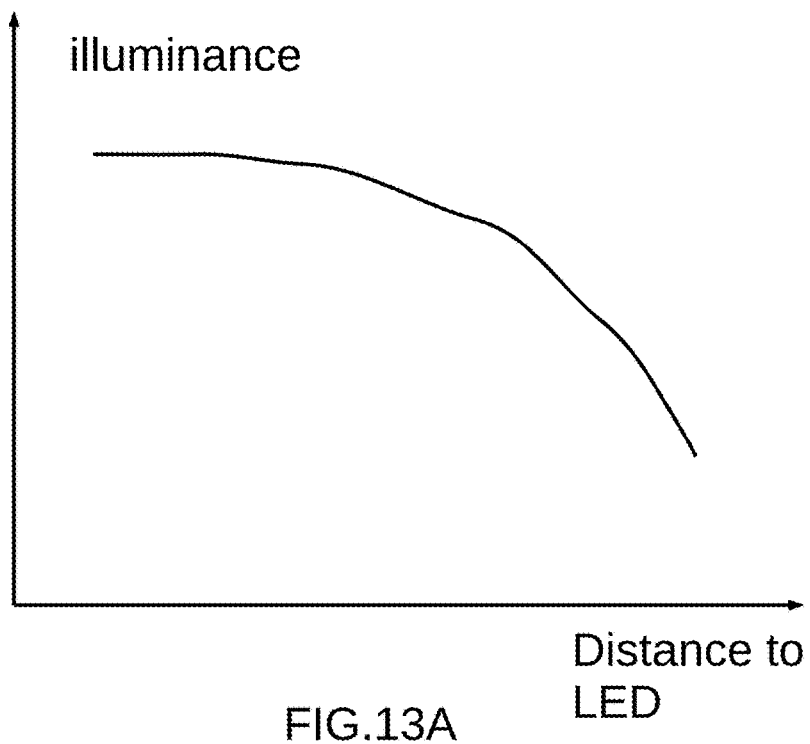
FIG. 13A illustrates illuminant distribution on a light plate guide.
Figure 13B:
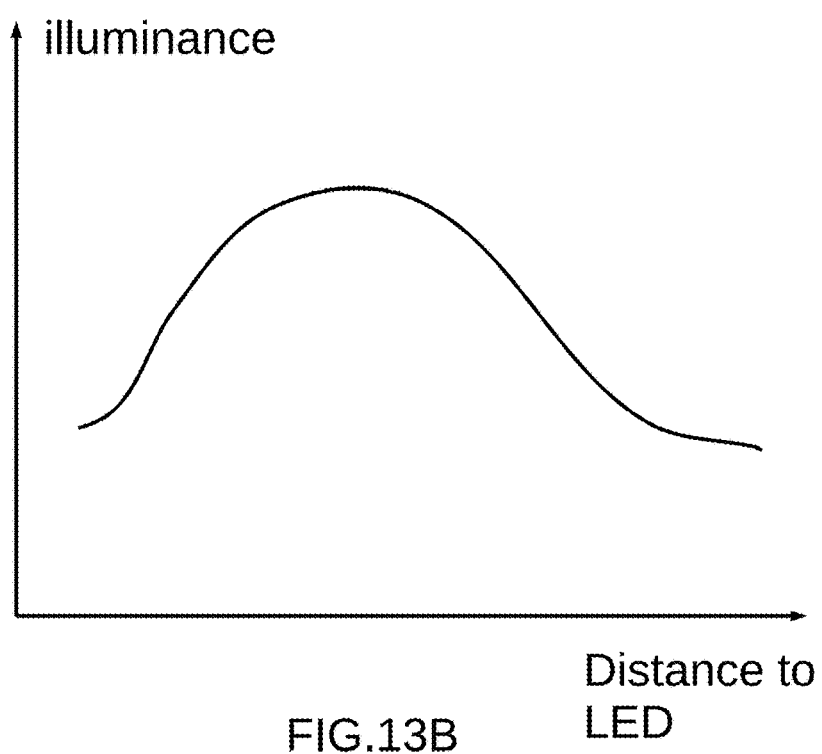
FIG. 13B illustrates another illuminant distribution on a light guide plate.

Please refer to FIG. 13A and FIG. 13B, which illustrate refraction point distribution along the axis extending from a light source like the LED strip mentioned above to outside of a cabinet.

In FIG. 13A, the density of the refraction points is largest in the area closest to a light source like a LED strip as mentioned above. The refraction point density gets smaller in the area more far away from the LED strip.

Compared with FIG. 13A, FIG. 13B illustrates a different distribution of the refraction points on a light guide plate. In the two ends, the refraction point density is smaller than the refraction point density in the middle portion.

Figure 14:
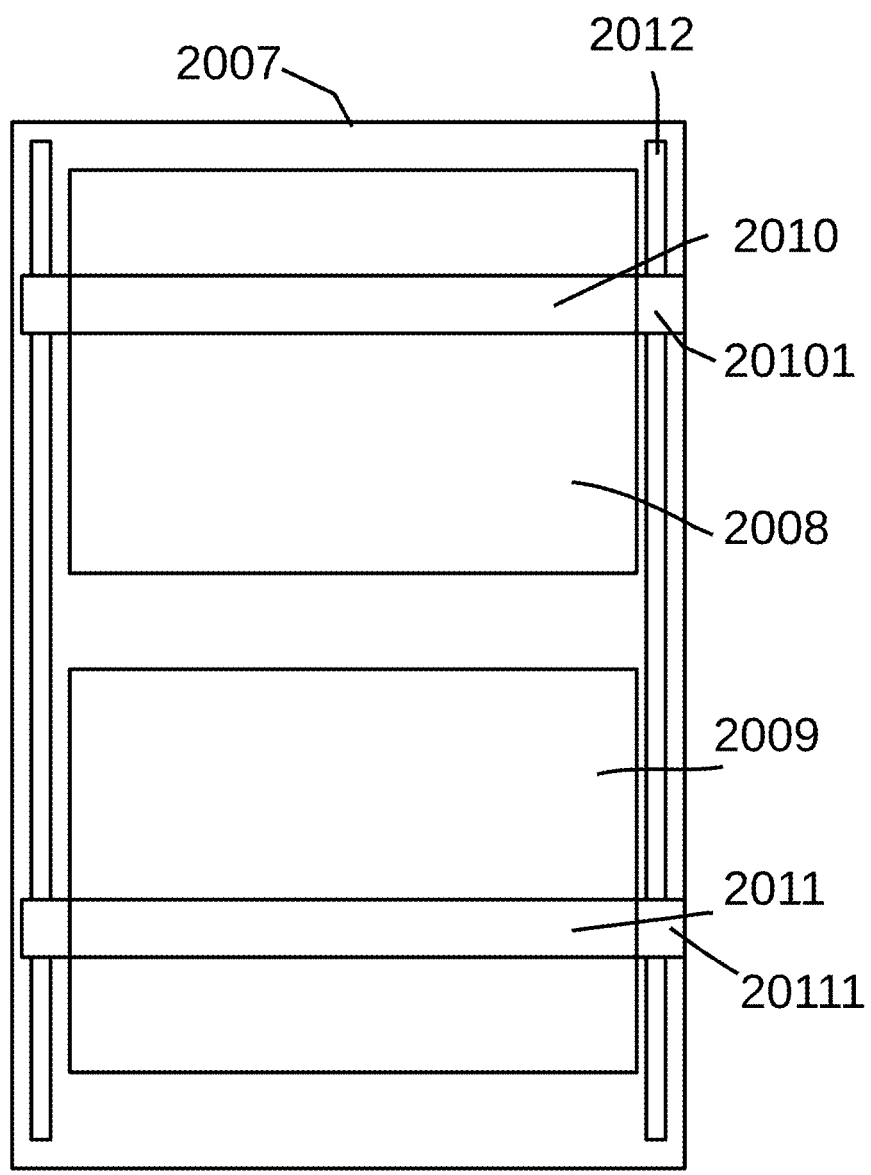
FIG. 14 illustrates an example with two light guide plates in a cabinet.

Please refer to FIG. 14, which illustrate more than two light guide plates 2010 and 2011 are arranged in a cabinet 2007. A conductive rail 2012 is arranged for conducting power from a power source to the light guide plates 2010 and 2011. Conductive terminals 20101, 20111 are used for conducting power from the conductive rail 2012 to the light guide plates 2010, 2011 respectively. The two light guide plates 2010, 2011 separately provides illumination to two portions 2008 and 2009. More than two light guide plates or other electronic devices like IoT (Internet of Things) devices or sensor devices may be arranged to get electricity from the conducting rail 2012.

Figure 15:
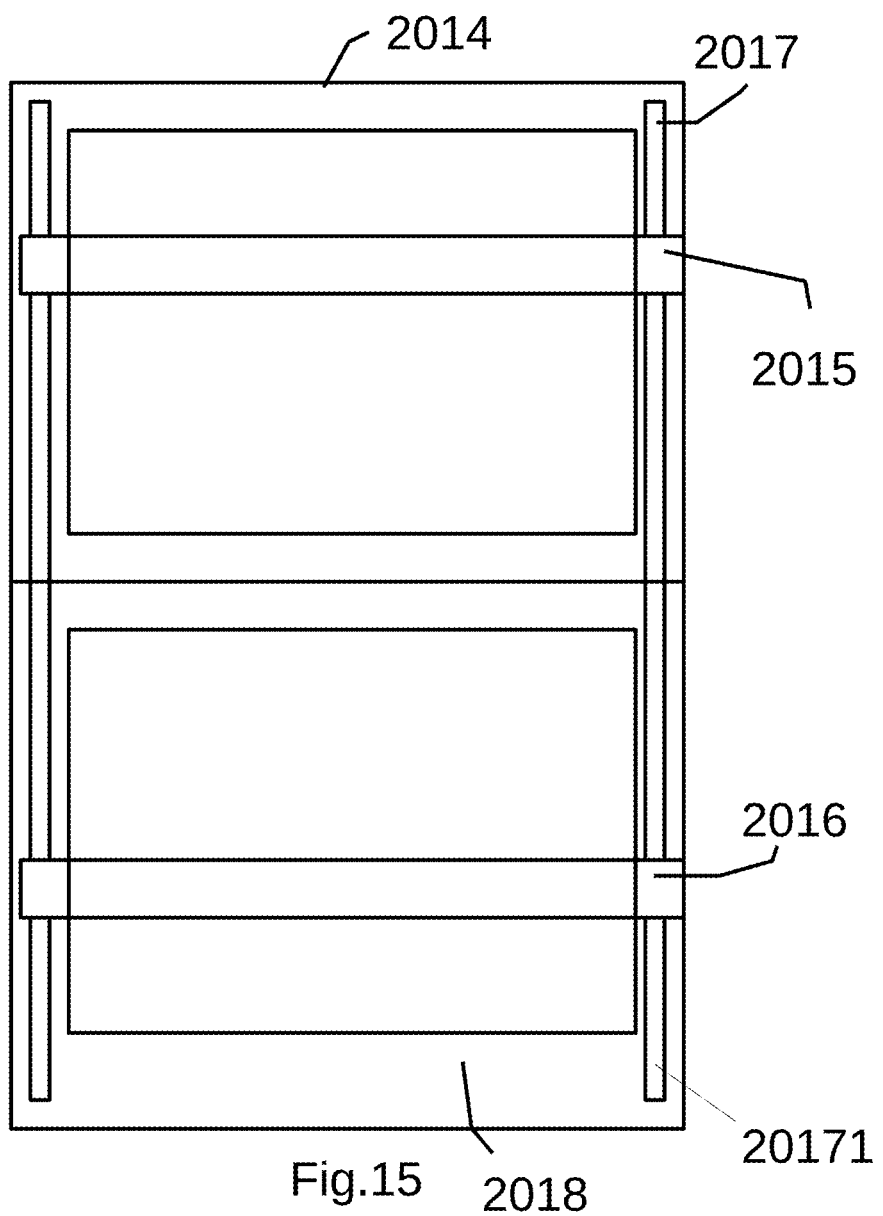
FIG. 15 illustrates two cabinets are connected with their conductive rails.

Please refer to FIG. 15, which illustrates two cabinets 2014, 2018 are combined together and their conductive rails 2017, 20171 may be connected when the two cabinets 2014, 2018 are combined. Corresponding structures for joining two cabinets together may be applied so that cabinets or other objects may be combined or separated when users want to, just like LEGO pieces which bring more fun and convenience on using such cabinets. Each cabinet 2014, 2015 may have its own light guide plate 2015, 2016 that gets electricity from a combined conductive rail of the two conductive rails 2017, 20171.

Figure 16:
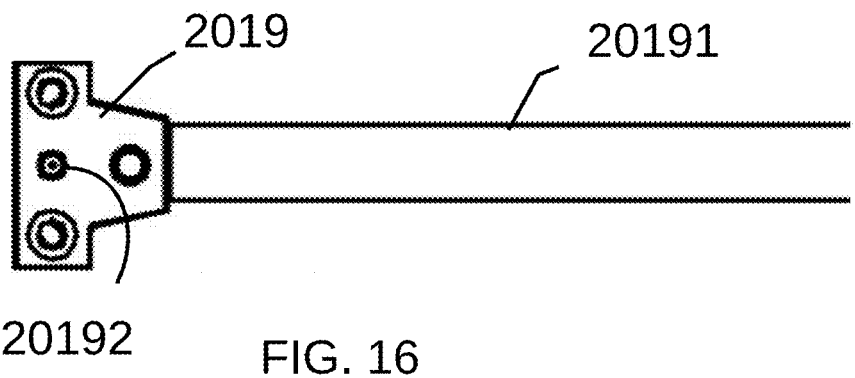
FIG. 16 illustrates a side view of a light guide plate.
Figure 17:
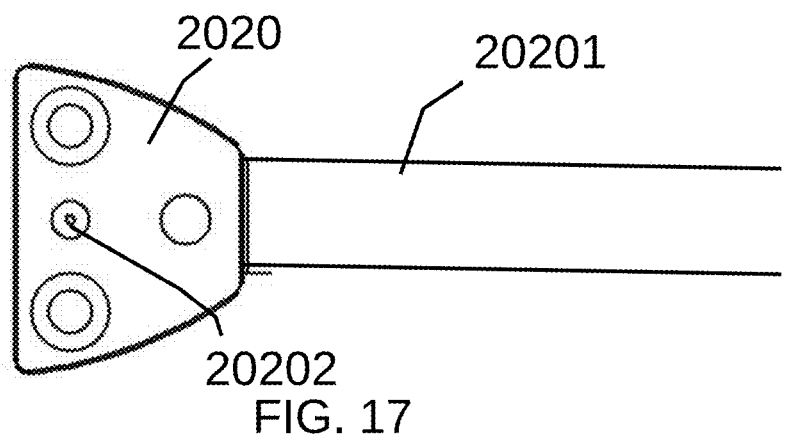
FIG. 17 illustrates a side view of another light guide plate.

The light guide plate may have different shapes based on different design requirements. For example, FIG. 16 and FIG. 17 illustrate two types of light guide plates. In FIG. 16, an illumination device 2019 that has a LED strip and corresponding circuits are placed on a housing. A conductive cap 20192 is used for contact with a conductive rail to power the illumination device 2019 to emit light from the light guide plate portion 20191.

In FIG. 17, another illumination device 2020 a different housing. Similarly, a conductive cap 20202 is provided to elastically abut on a conductive rail (not shown). A light guide plate 20201 is used for directing light to desired locations.

Figure 18:
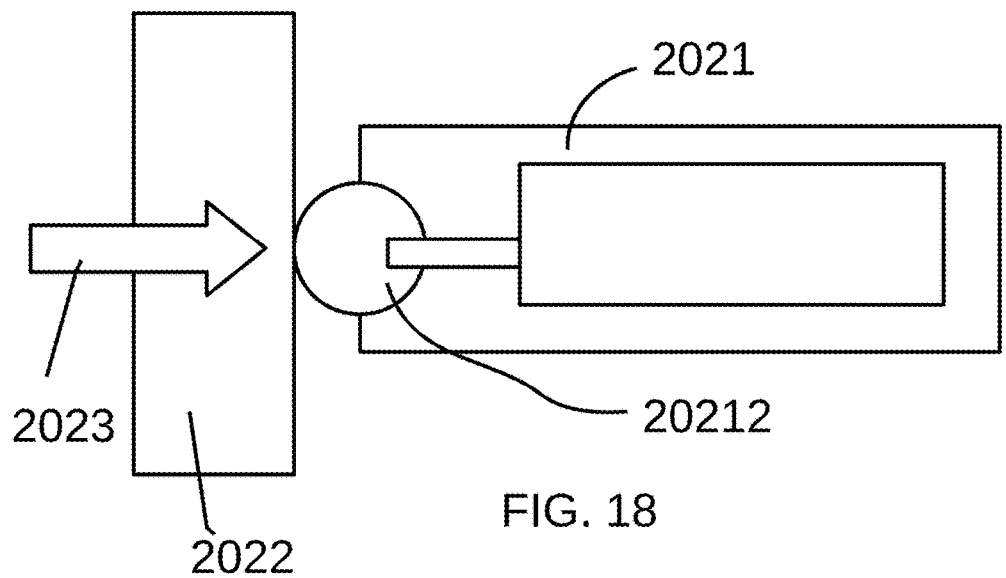
FIG. 18 illustrates a movement status of a light guide plate with respect to a conductive rail.
Figure 19:
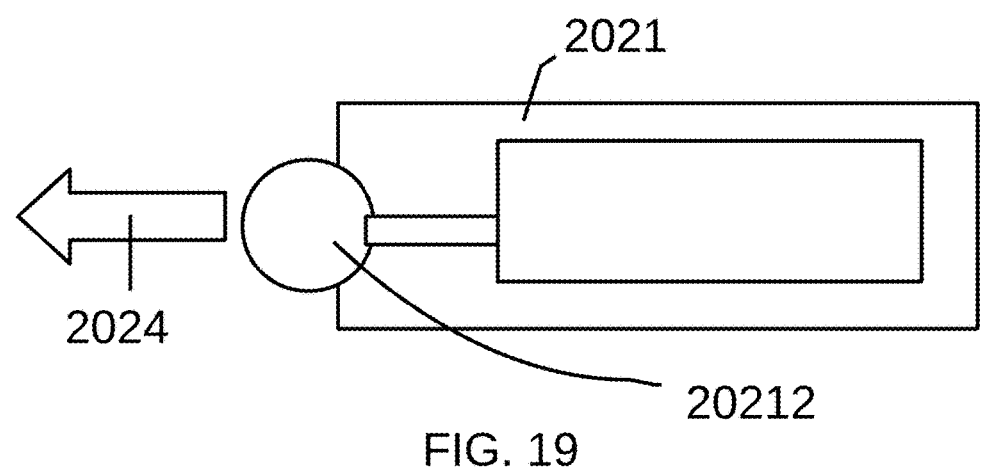
FIG. 19 illustrates another movement status of a light guide plate with respect to a conductive rail.

Please refer to FIG. 18 and FIG. 19, which illustrate relation between an illumination device and a conductive rail. In FIG. 18, an illumination device 2021 has a conductive terminal 20212 elastically abutting on a conductive rail 2022. In this illustrated example, the conductive terminal 2012 has a deformation and generates an elastic force against the conductive rail 2022 along a first direction 2023. In FIG. 19, the illumination device 2021 is not installed at right place to get electrical power connected. The conductive terminal 20212 is released to stay at a normal status facing a second direction 2024. Please be noted that FIG. 18 and FIG. 19 are used only for explaining the structure relation. In actual design, the conductive terminal and the illumination device may be designed with various structures to achieve the same structure function and relation.

In the example illustrated in FIG. 18 and FIG. 19, the conductive terminal 20212 is fixed on the illumination device 2021. Compared with FIG. 18 and FIG. 19, please refer to FIG. 20, FIG. 21 and FIG. 22, which illustrate an alternative design and relation between the conductive rail, the conductive terminal and the illumination device.

Figure 20:
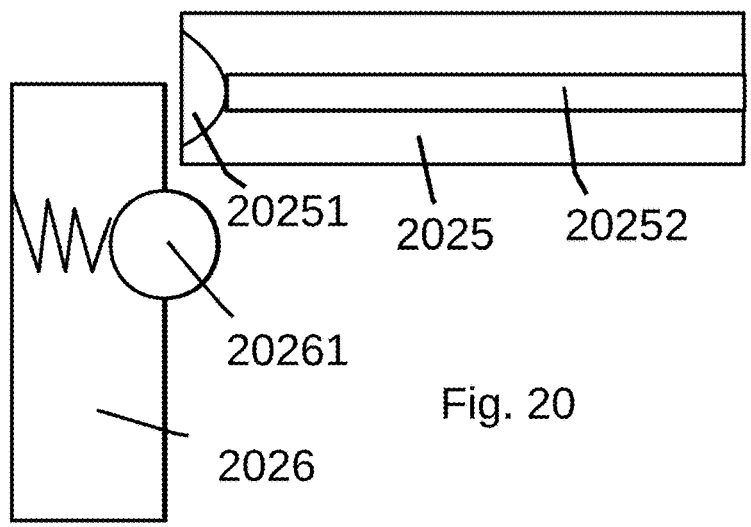
FIG. 20 illustrates a side view of a light guide plate status with respect to a conductive rail.
Figure 21:
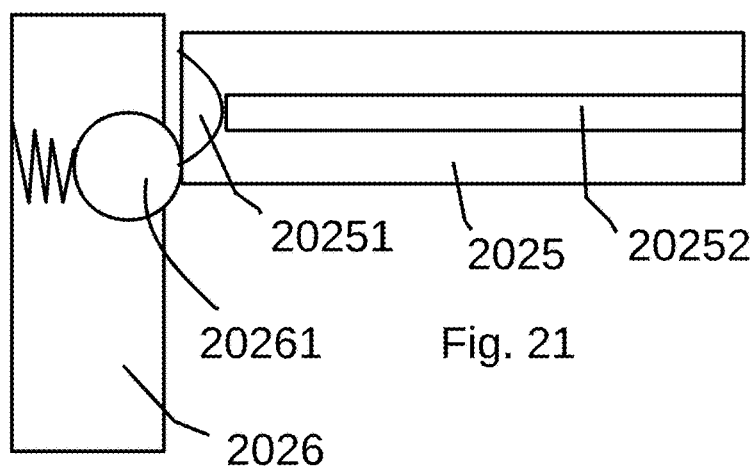
FIG. 21 illustrates a side view of another light guide plate status with respect to a conductive rail.
Figure 22:
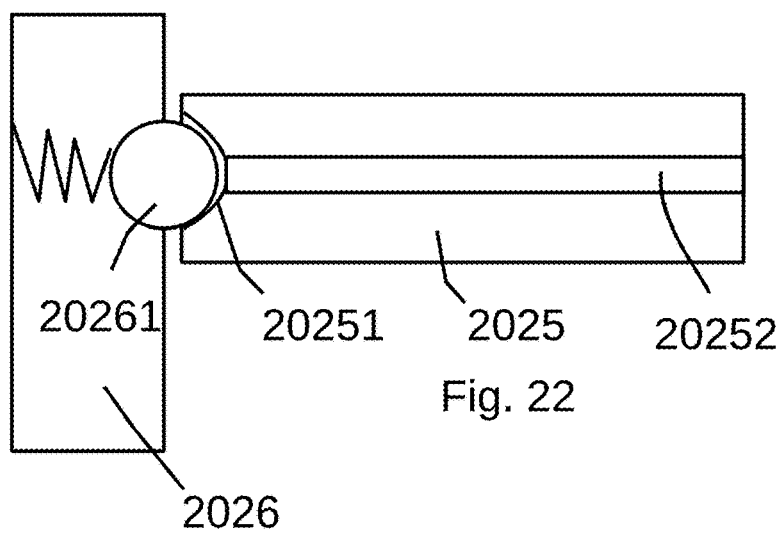
FIG. 22 illustrates a side view of another light guide plate status with respect to a conductive rail.

In FIG. 20, an illumination device 2025 has a LED strip and corresponding circuits 20252, e.g. a driver circuit. In the housing of the illumination device 2025, there is a cavity 20251. Corresponding to the cavity 20251, the conductive rail 2026 has a conductive ball 20261 as the conductive terminal pressed by a spring element. FIG. 20 illustrates the status in which the illumination device 2025 does not engage the conductive ball 20261. FIG. 21 illustrates a status in which the illumination device 2025 starts engaging the conductive ball 20251. FIG. 22 illustrates another status in which the illumination device 2025 is electrically connected to the conductive ball 20261. With such design, the illumination device 2025 may be easily and flexibly detached from the conductive rail 2026. Besides, FIG. 20, FIG. 21 and FIG. 22 show that the conductive terminal may be disposed on the conductive rail as an alternative design compared with the example illustrated in FIG. 18 and FIG. 19.

Figure 23:
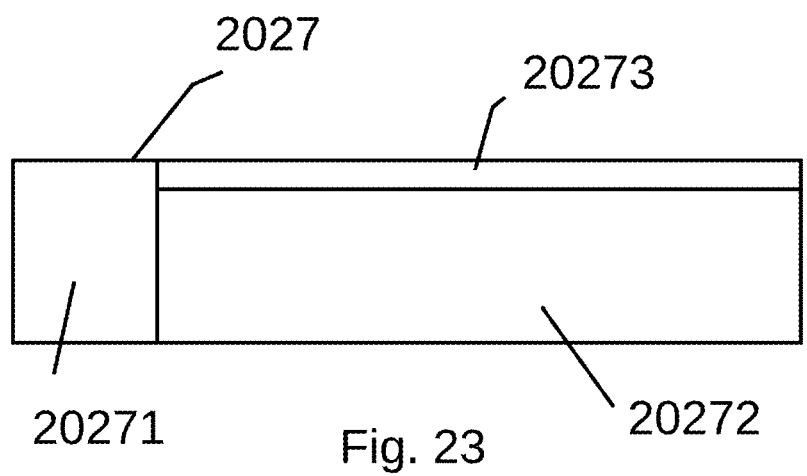
FIG. 23 illustrates a light guide plate example.

Please refer to FIG. 23, which illustrates another example of an illumination device 2027. The illumination device 2027 has an LED strip module 20271, a light guide plate 20272 and a normal plate 20273. The normal plate 20273 may be implemented with various materials, e.g. wood, metal, plastic, etc. The normal plate 20273 may be attached to the light guide plate 20272.

Figure 24:
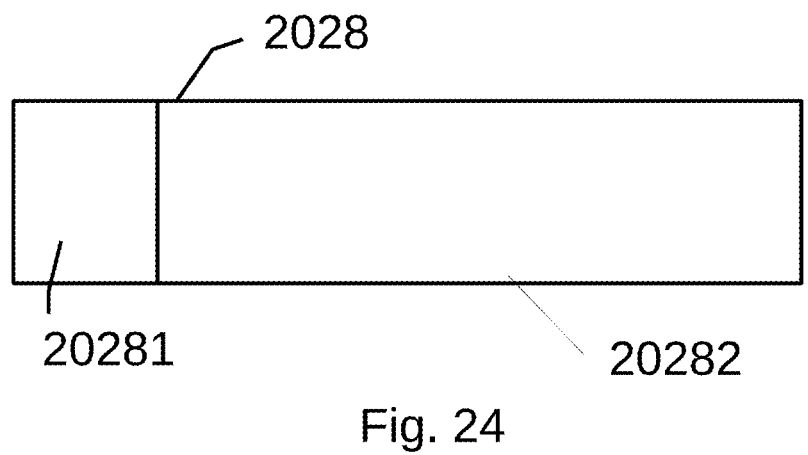
FIG. 24 illustrates another light guide plate example.

FIG. 24 illustrate another example of an illumination device 2028 that has a LED strip module 20281 and a light guide plate 20282. In this example, it is illustrated that the light guide plate 20282 does not have a cover plate. Other designs may be chosen under different design requirements.

Figure 1A:
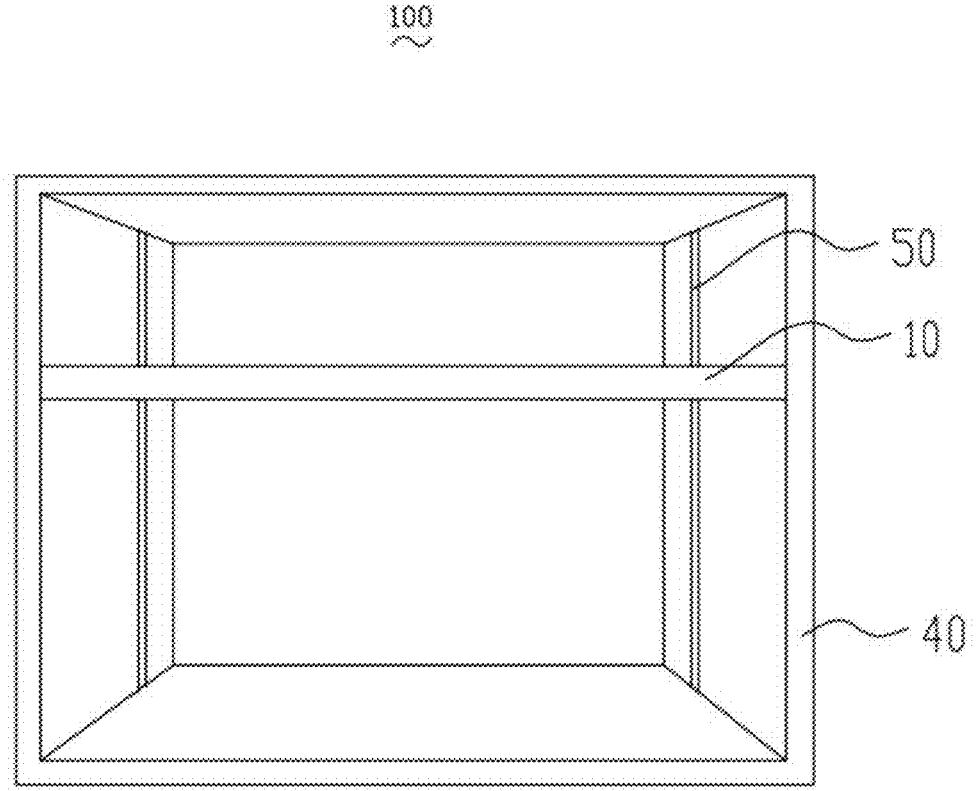
FIG. 1A is a perspective view of a cabinet in a first embodiment of the invention.
Figure 1B:
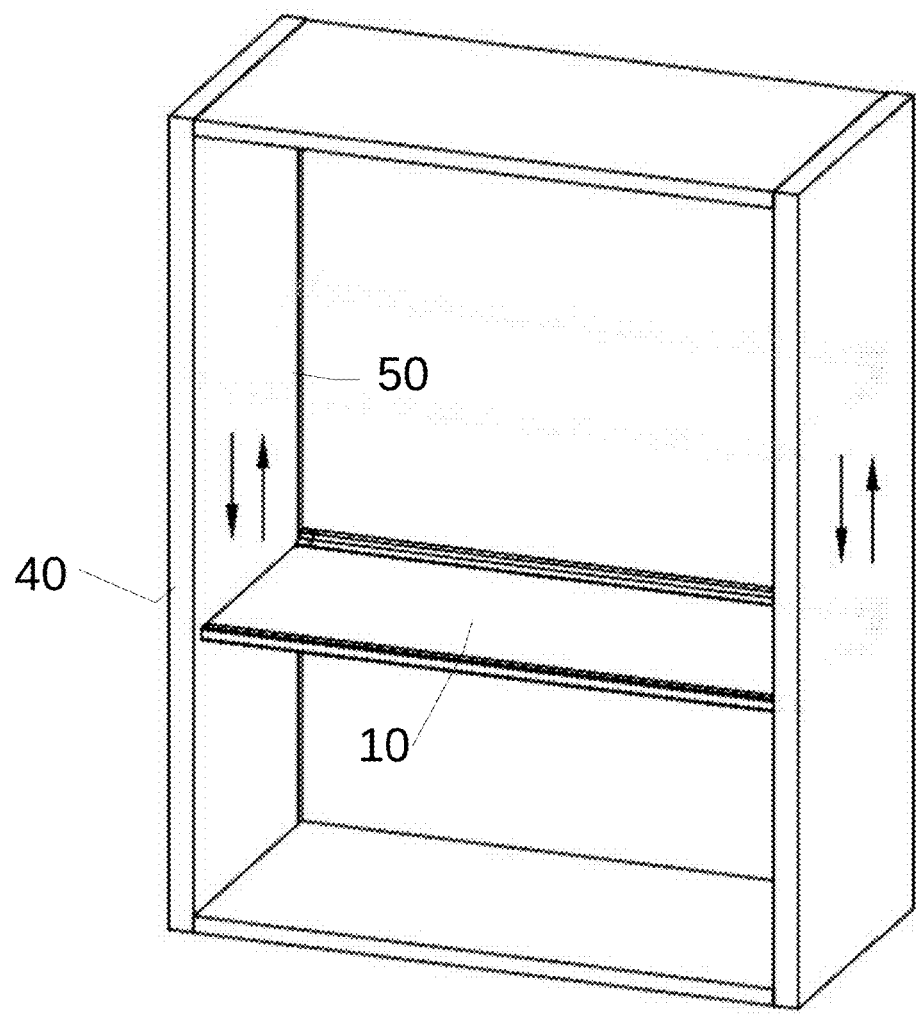
FIG. 1B is another perspective view of the cabinet of FIG. 1A.
Figure 2:
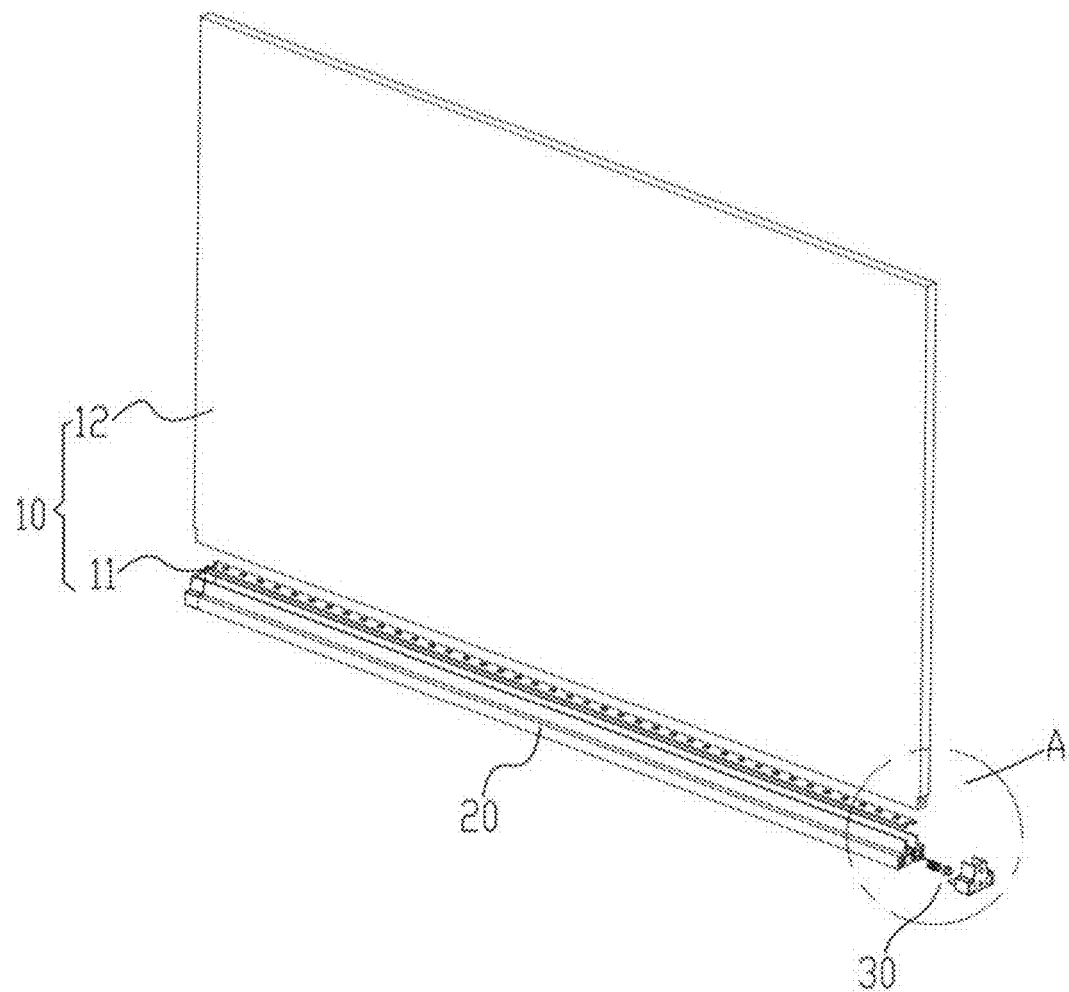
FIG. 2 is an exploded stereogram of a light emitting element, a light housing and a conductive terminal of the cabinet light as shown in FIG. 1A.
Figure 3:
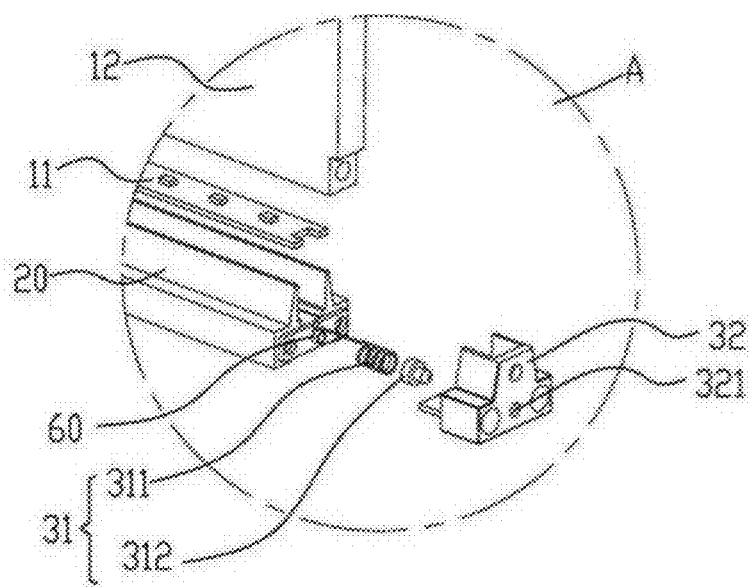
FIG. 3 is an enlarged diagram of part A as shown in FIG. 2.
Figure 4:
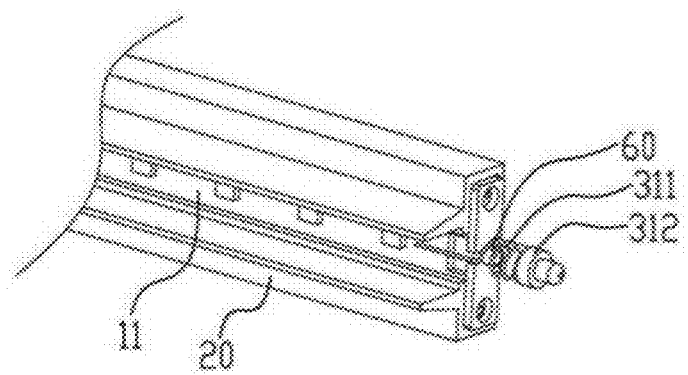
FIG. 4 is a partial assembly diagram of the light emitting element, the light housing and the conductive terminals of the cabinet light as shown in FIG. 2.
Figure 5:
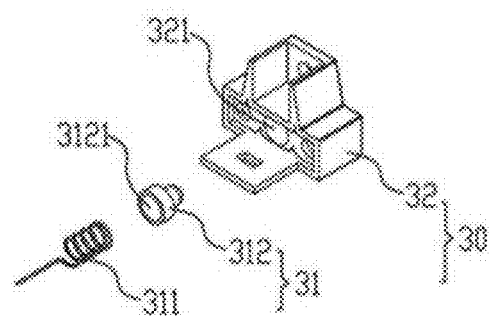
FIG. 5 is an exploded stereogram of the conductive terminals of the cabinet light as shown in FIG. 2.
Figure 6:
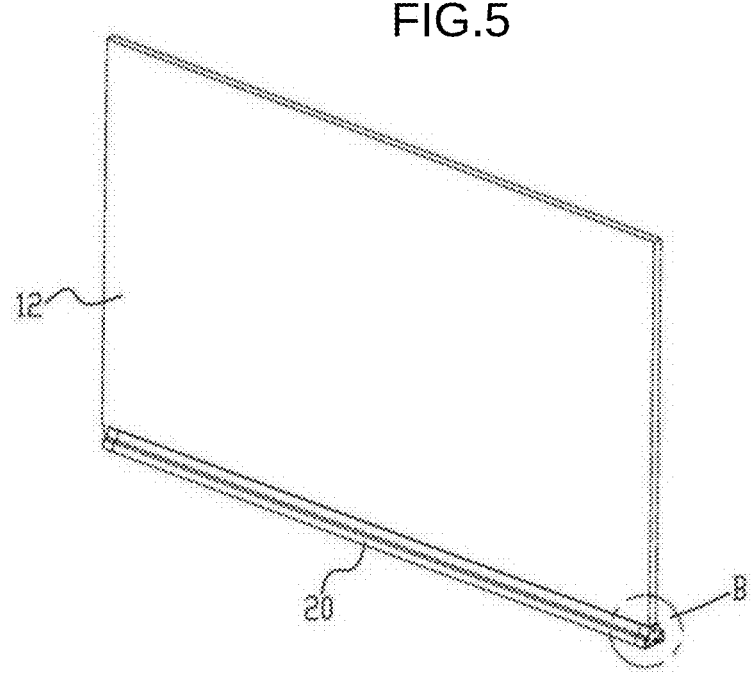
FIG. 6 is an assembly diagram of the light emitting element, the light housing and the conductive terminals of the cabinet light as shown in FIG. 2.
Figure 7:
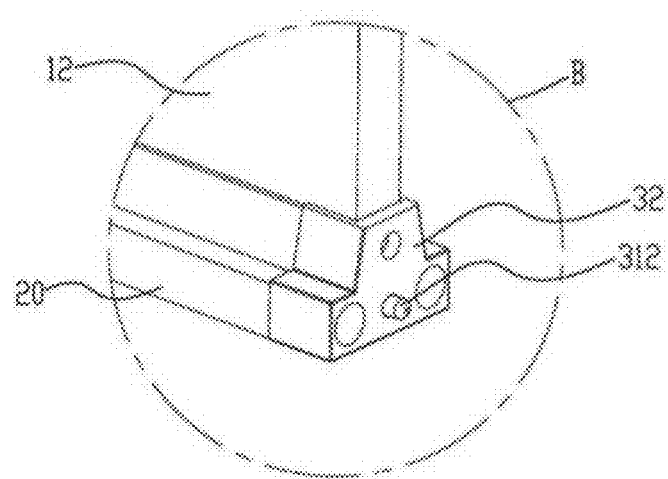
FIG. 7 is an enlarged diagram of part B as shown in FIG. 2.

Please refer to FIG. 1A, FIG. 1B, FIG. 2, FIG. 3, FIG. 4, FIG. 5, FIG. 6 and FIG. 7. FIG. 2 is an exploded stereogram of a light emitting element, a light housing and a conductive terminal of the cabinet light as shown in FIG. 1A. FIG. 3 is an enlarged diagram of part A as shown in FIG. 2. FIG. 4 is a partial assembly diagram of the light emitting element, the light housing and the conductive terminals of the cabinet light as shown in FIG. 2. FIG. 5 is an exploded stereogram of the conductive terminals of the cabinet light as shown in FIG. 2. FIG. 6 is an assembly diagram of the light emitting element, the light housing and the conductive terminals of the cabinet light as shown in FIG. 2. FIG. 7 is an enlarged diagram of part B as shown in FIG. 2.

The cabinet light includes a light emitting element 10, a light housing 20, conductive terminals 30, a cabinet body 40 and conductive rails 50. The light emitting element 10 and the conductive terminals 30 are fixed on the light housing 20. The conductive rails 50 are fixed on the cabinet body 40. One end of the conductive terminal 30 is electrically connected to the light emitting element 10.

The light emitting element 10 includes a LED light source plate 11 and a light guide plate 12. The LED light source plate 11 is electrically connected to the conductive terminals 30. The light guide plate 12 is set facing to the light emitting surface of the LED light source plate 11. The light guide plate 12 is configured to refract light beam emitted by the LED light source plate 11 towards the inner wall of the cabinet body 40. The light guide plate 12 is a plate structure. The LED light source plate of the light emitting element 10 is set away from the opening side of the cabinet body 40. The side wall of the light guide plate 12 is set facing to the light emitting surface of the LED light source plate 11. The front side and the back side of the light guide plate 12 are set with light exiting surfaces. Each light exiting surface corresponding to the light beam emitted by the LED light source plate 11 is arranged with a plurality of refractive points. These refractive points are more densely distributed close to the position of the LED light source plate 11, with the goal to refract more light beams out in the deep place of the cabinet body 40, so as to illuminate the deep place of the cabinet body 40.

The conductive terminal 30 includes an elastic electrode 31 and a fixing cover 32. The fixing cover 32 is fixed on the light housing 20. The fixing cover 32 has a reception hole 321. One end of the elastic electrode 31 is electrically connected to the light emitting element 10. The middle part of the elastic electrode 31 is fixed in the reception hole 321. The other end of the elastic electrode 31 passes through the reception hole 321 and outstretches to the outside of the fixing cover 32. The elastic electrode 31 includes a spring 311 and a conductive cap 312. The spring 311 is made of conductive materials. One end of the conductive cap 312 has a slot 3121. One end of the spring 311 is electrically connected to the light emitting element 10. The other end of the spring 311 abuts the interior of the slot 3121 of the conductive cap 312. The conductive cap 312 passes through the reception hole 321 and outstretches to the outside of the fixing cover 32 to electrically connect to the conductive rails 50. One side of the LED light source plate 11 is arranged with a positioning post 60. One side of the spring 311 is installed on the positioning post 60, and one end of the spring 311 is electrically connected to the LED light source plate 11.

At least one positioning element (not shown) of the cabinet body 40 is provided corresponding to the light housing 20. When the light housing 20 is fixed on the cabinet body 40 via the positioning element (not shown), the other end of the conductive terminal 30 is elastically and electrically connected to the conductive rail 50. Two set of positioning elements are arranged on the cabinet body 40. These positioning elements are protruding structures placed on the side wall of the cabinet body 40. Each set of positioning elements is respectively set close to the conductive rail 50. These positioning elements are sliding rail structures, which may be regular sliding rail structures such as sliding rails used in a drawer. These positioning elements are set parallel to these conductive rails 50. The light emitting element 10 is fixed on the positioning element which may be moved back and forth along the positioning element relative to the cabinet body 40. At least two elastic abut blocks (not shown) may be further provided. The elastic abut blocks (not shown) are set with intervals along the direction parallel to the positioning element. When the light emitting element 10 moves to the position of these elastic abut blocks, the light emitting element 10 may abut to the elastic abut block so as to be fixed relative to the cabinet 40.

There may be two conductive rails 50. These two conductive rails 50 are set parallel to each other. There may be two conductive terminals 30, and the conductive terminals 30 are set with intervals on the cabinet body 40 corresponding to the two conductive rails 50 respectively. A direct current power may be further provided. The conductive rails 50 are electrically connected to the direct current low voltage power supply. The direct current low voltage power supply may be fixed on the cabinet body 40.

In summary, the invention provides a design of the conductive rails 50 arranged inside a cabinet. By electrically connecting the conductive rails 50 with the light emitting element 10 via the conductive terminals 30, electrical power is supplied to the light emitting element 10. By implanting the conductive rails 50 into the cabinet 40, the difficulty of wiring and wire connection of the power connection to the light emitting element 10 are avoided. Also, the positive and negative electrodes may be converted designed, such that the connection between the light emitting element 10 and the conductive rails 50 need not to be in a specific direction, which further facilitating the flexible installation of lighting inside the cabinet. In addition, through the elastically and electrically connection between the other end of the conductive terminals 30 and the conductive rails 50, the light emitting element 10 may be moved freely along the conductive rails 50 while kept being powered on, such that users may choose the height of illumination based on their need, which brings great convenience to users, thus making the cabinet light having advantages of simple wiring and use flexibility.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. A cabinet apparatus, comprising:
   a cabinet body;
   a conductive rail disposed inside the cabinet body, wherein the conductive rail is connected to a power supply;
   an illumination device;
   a conductive terminal connected to the illumination device and the conductive rail, the conductive terminal being adjustable to elastically engage the conductive rail for conducting electricity from the power supply to the illumination device; and
   a positioning element for stabilizing the conductive terminal to one of the predetermined positions, wherein the positioning element comprises a sliding rail structure.

2. The cabinet apparatus of claim 1, wherein the illumination device comprising an LED strip and a light guide plate for guiding light emitted from the LED strip to inner space of the cabinet body.

3. The cabinet apparatus of claim 1, wherein the LED strip is placed in the inner portion of the cabinet body, and the light guide plate has more light refraction points near the LED strip.

4. The cabinet apparatus of claim 1, wherein the conductive rail has a plurality of predetermined positions to be chosen by a user for engaging the conductive terminal to one of the predetermined positions to adjust an illumination effect of the illumination device in the cabinet body.

5. The cabinet apparatus of claim 1, wherein the conductive terminal comprises an elastic electrode abutting on the conductive rail with an elastic force of the elastic electrode.

6. The cabinet apparatus of claim 5, wherein the conductive terminal further comprises a fixing cover, and one end of the elastic electrode engages with the illumination device and the other end of the elastic electrode outstretches through the fixing cover to abut the conductive rail.

7. The cabinet apparatus of claim 6, wherein the elastic electrode comprises a spring and a conductive cap, the conductive cap has a slot for receiving an end of the spring, the fixing cover has a reception hole, the conductive cap extending through the reception hole to abut the conductive rail.

8. The cabinet apparatus of claim 1, further comprising a second conductive rail and a second conductive terminal, the second conductive terminal connecting to the illumination device opposite to the conductive terminal, and the second conductive terminal further connecting to the second conductive rail.

9. The cabinet apparatus of claim 1, wherein the conductive rail is disposed along a vertical direction relative to the cabinet body.

10. The cabinet apparatus of claim 1, further comprising a second illumination device to be connected to the conductive rail.

11. The cabinet apparatus of claim 1, further comprising a rechargeable battery and a socket for charging the rechargeable battery, the rechargeable battery being connected to the conductive rail to serve as the power supply.

12. The cabinet apparatus of claim 1, wherein the illumination device and the conductive terminal form a module and is detachable from the conductive rail.

13. A cabinet light assembly to be assembled to a cabinet body, comprising:
   a conductive rail to be installed inside the cabinet body, wherein the conductive rail is connected to a power supply;
   an illumination device; and
   a conductive terminal to be connected to the illumination device and the conductive rail, the conductive terminal being adjustable to elastically engage the conductive rail for conducting electricity from the power supply to the illumination device, wherein the conductive terminal comprises an elastic electrode abutting on the conductive rail with an elastic force of the elastic electrode, and wherein the conductive terminal further comprises a fixing cover, and one end of the elastic electrode engages with the illumination device and the other end of the elastic electrode outstretching through the fixing cover to abut the conductive rail.

14. The cabinet light assembly of claim 13, wherein the illumination device comprising an LED strip and a light guide plate for guiding light emitted from the LED strip to inner space of the cabinet body.

15. The cabinet light assembly of claim 14, wherein the LED strip is placed in the inner portion of the cabinet body, and the light guide plate has more light refraction points near the LED strip.

16. The cabinet light assembly of claim 13, wherein the conductive rail has a positioning element defining a plurality of predetermined positions to be chosen by a user for engaging the conductive terminal to one of the predetermined positions to adjust an illumination effect of the illumination device in the cabinet body.

17. The cabinet light assembly of claim 13, wherein the elastic electrode comprises a spring and a conductive cap, the conductive cap has a slot for receiving an end of the spring, the fixing cover has a reception hole, the conductive extending through the reception hole to abut the conductive rail.

* * * * *